(12) United States Patent
Döhring

(10) Patent No.: US 11,970,866 B2
(45) Date of Patent: Apr. 30, 2024

(54) MINERAL WOOL BOARD WITH FILLERS

(71) Applicant: Lignum Technologies AG, Niederteufen (CH)

(72) Inventor: Dieter Döhring, Großenhain (DE)

(73) Assignee: Lignum Technologies AG, Niederteufen (CH)

( * ) Notice: Subject to any disclaimer, the term of this patent is extended or adjusted under 35 U.S.C. 154(b) by 660 days.

(21) Appl. No.: 17/259,652

(22) PCT Filed: Jul. 12, 2018

(86) PCT No.: PCT/EP2018/068993
§ 371 (c)(1),
(2) Date: Jan. 12, 2021

(87) PCT Pub. No.: WO2020/011364
PCT Pub. Date: Jan. 16, 2020

(65) Prior Publication Data
US 2022/0018138 A1    Jan. 20, 2022

(51) Int. Cl.
*E04F 13/16* (2006.01)
*C03C 13/06* (2006.01)
*C08L 101/00* (2006.01)

(52) U.S. Cl.
CPC .............. *E04F 13/16* (2013.01); *C03C 13/06* (2013.01); *C08L 101/00* (2013.01)

(58) Field of Classification Search
CPC ................................. E04F 13/16; C03C 13/06
See application file for complete search history.

(56) References Cited

U.S. PATENT DOCUMENTS

| | | | |
|---|---|---|---|
| 3,804,706 A | 4/1974 | Kurashige | |
| 2006/0159909 A1* | 7/2006 | Aslan | C09D 5/18 428/323 |
| 2013/0221567 A1* | 8/2013 | Jorgensen | D04H 1/435 524/436 |
| 2020/0108524 A1* | 4/2020 | Schrul | B27N 3/04 |

FOREIGN PATENT DOCUMENTS

| | | |
|---|---|---|
| CA | 809125 A | 3/1969 |
| CA | 2318273 C | 10/2011 |
| CA | 2870051 A1 | 11/2013 |
| CN | 101126157 A * | 2/2008 |
| CN | 104379348 A | 2/2015 |

(Continued)

OTHER PUBLICATIONS

Original and English Translation of Ukrainian Decision to Grant issued for corresponding Ukrainian Application No. a 2021 00576, dated Mar. 22, 2022.

(Continued)

*Primary Examiner* — Christine T Cajilig
(74) *Attorney, Agent, or Firm* — Renner, Otto, Boisselle & Sklar, LLP

(57) ABSTRACT

A method for manufacturing a mineral wool board, comprising the following steps: providing mineral wool fibers having a fiber length of 50 to 800 μm; providing a binder comprising a mixture of liquid resin and mineral fillers having an average grain size $d_{50}$ of 10 nm to 250 μm; gluing the fibers with the binder, and compressing the glued fibers using heat and pressure.

19 Claims, 2 Drawing Sheets

(56) References Cited

FOREIGN PATENT DOCUMENTS

Figure 1:
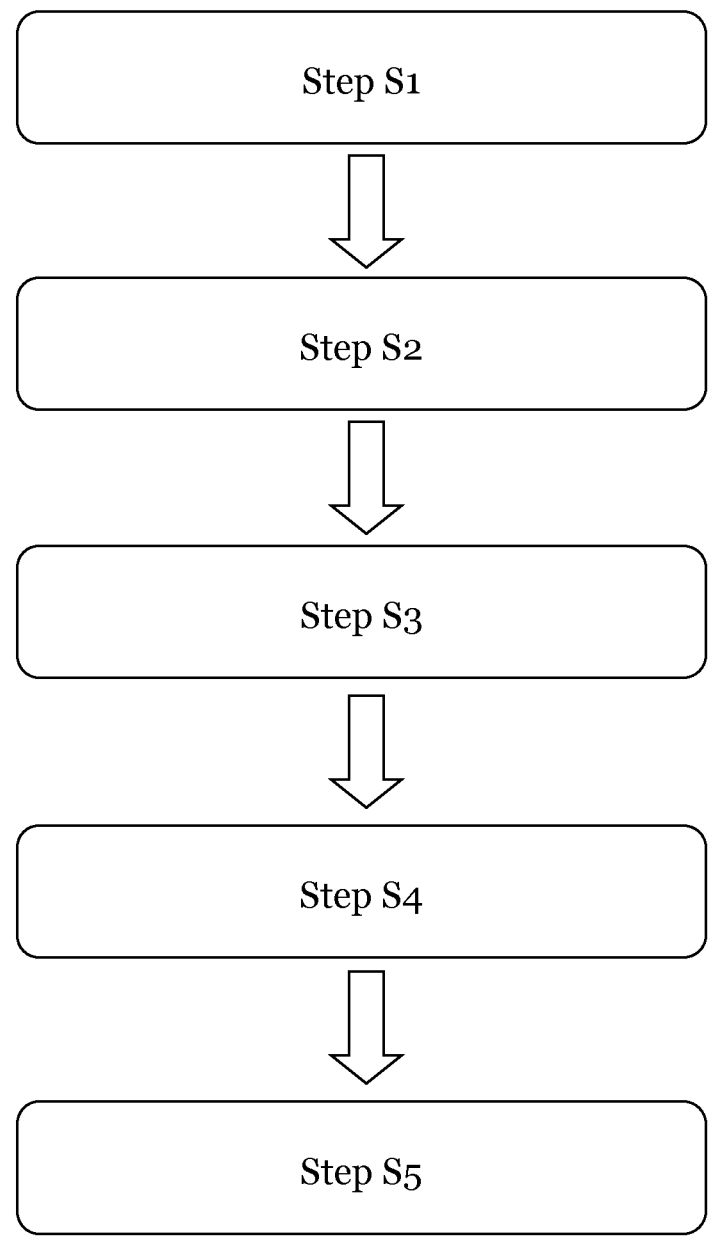

| | | | |
|---|---|---|---|
| EP | 0114965 A2 * | 8/1984 | |
| EP | 0114965 A2 | 8/1984 | |
| EP | 1669490 A1 | 6/2006 | |
| GB | 1045780 A | 10/1966 | |
| JP | H11269795 A | 10/1999 | |
| JP | 2008231788 A | 10/2008 | |
| RU | 2209203 C2 | 7/2003 | |
| UA | 99130 C2 | 7/2012 | |
| WO | 2014053186 A1 | 4/2014 | |
| WO | 2017194722 A1 | 11/2017 | |

OTHER PUBLICATIONS

Original and English Translation of Russian Decision on Granting a Patent for Invention issued for Russian Patent Application No. 2021100890/03(001662), dated Jul. 23, 2021.
Canadian Examination Report issued for corresponding CA Application No. 3,103,701, dated Nov. 16, 2022.
Canadian Examination Report issued for corresponding CA Application No. 3,103,701, dated Jun. 12, 2023.
Original and English Translation of Chinese First Office Action for corresponding CN Application No. 201880095564.4, dated Sep. 2, 2021.
International Search Report and Written Opinion dated Mar. 14, 2019, for International Patent Application No. PCT/EP2018/068993.
International Preliminary Report on Patentability dated Nov. 5, 2020, for International Patent Application No. PCT/EP2018/068993.

* cited by examiner

MINERAL WOOL BOARD WITH FILLERS

This application is a national phase of International Application No. PCT/EP2018/068993 12 Jul. 12, 2018, the disclosure of which is hereby incorporated by reference.

FIELD OF THE INVENTION

The present invention relates to a method to produce mineral wool boards, as well as a mineral wool board produced by such a method. The boards are used, for example, as wall cladding, floor covering or in dry construction.

TECHNICAL BACKGROUND

A large number of panels or boards for wall, ceiling or floor coverings are known from the state of the art. For example, so-called laminate panels are widely used as indoor floor coverings. They are usually based on a carrier board made of MDF or HDF wood material with a melamine resin impregnated decorative paper on the top side. The resins harden by pressing under the influence of heat and pressure, so that a highly abrasion-resistant surface is obtained. A disadvantage of such laminate panels is that they are generally unsuitable for outdoor applications where they are exposed to weather and moisture.

From the same applicant's WO 2014/053186, an improved outdoor floor panel is known, using a carrier board that is better suited for outdoor use. The carrier board should consist of MDF or HDF of acetylated wood, a fiber cement board or a preferably specially treated PVC board. As an alternative to laminate panels, high-quality PVC-based panels have also been known for some time and are marketed under the term LVT. A decorative paper web is glued onto a soft PVC layer or sheet in order to provide the visible surface of the PVC with a desired decor. Such PVC-based panels are hardly suitable for applications where they are exposed to weather conditions, such as UV radiation or moisture.

Furthermore, building materials made of mineral fibers, which are often used as insulating materials, are known from the state of the art. For this purpose, mineral fibers are spun from molten basalt stone, for example, and a considerable part of these fibers is sprayed with a liquid binder immediately after the spinning process. The residual heat from the spinning process is used to evaporate the solvent water of the binder and to further condense the binder. Later the fibers are compressed to insulation boards with very low density. The binder serves to loosely bond the fibers so that the insulation boards remain in their shape. The density of these insulation boards is between 20 and 200 kg/m$^3$. The binders used are very low molecular weight and have a high water dilutability. They are especially known under the name "mineral wool resins".

Furthermore, it is known to use resin-bound mineral wool fiber boards for cladding facades (as facade panels). For this purpose, for example, solid powdery resins are used. These powders are mixed dry with the fibers and this mixture is fed to a press.

The present invention aims to improve the state of the art and in particular to provide an improved method for the production of mineral wool boards. The method should lead to robust and resistant boards while still allowing an economical production thereof. These and other tasks, which are mentioned in the following description or can be recognized by the skilled person, are solved with a method for producing a mineral wool board according to claim 1 and a mineral wool board according to claim 13.

DETAILED DESCRIPTION OF THE INVENTION

According to the present invention, a method is provided to produce a mineral wool board, which can for example be used as cladding for the exterior of buildings. In a first step, mineral wool fibers having a fiber length of 50 to 800 µm are provided. Mineral wool is a material made of artificially produced mineral fibers. Depending on the starting material, a distinction is made, for example, between slag wool, glass wool or rock wool. Mineral wool is widely used as insulation material in the thermal insulation of houses or as sound and fire protection material. The mineral wool or mineral wool fibers must be provided with a binder and pressed under the influence of heat and pressure to form usable boards or panels. In a second step (which can also take place before or simultaneously with the first step), a binder is therefore provided which comprises a mixture of liquid resin and mineral fillers with an average grain size $d_{50}$ of 10 nm to 150 µm. The mineral fillers are available from commercial suppliers. The particle size specifications of the manufacturers are sufficiently reliable, since the effect does not depend on the exact size, but the fillers can be used in a wide range of sizes. Alternatively, the corresponding FEPA standards (Federation of European Producers of Abrasives) can be used directly or analogously to determine the particle sizes and particle size distribution. The mixture of resin and fillers is preferably prepared in advance by stirring the mineral fillers into the liquid resin. In a further step, ultrasound is then applied to the binder, i.e. to the mixture of resin and fillers, in order to distribute the fillers in the liquid resin and preferably to destroy any agglomerates of fillers. Ultrasonic treatment is an essential means of this process and ensures a good dispersion of the fillers in the liquid resin.

In a fourth step, the provided fibers are glued with the binder. For example, the mineral wool fibers can be glued with the binder, i.e. the mixture of liquid resin and fillers, in a blow line so that the liquid binder is well distributed on the fibers. The glued fibers are then pressed, if necessary after a drying step, using heat and pressure to form a board with a density of more than 500 kg/m$^3$. Due to the high density, the boards are well suitable for many applications, for which commonly produced mineral wool boards are unsuitable due to their low density. By pressing under heat and pressure, water is removed from the binder and the resin cures. This results in a chemical reaction of the resin, usually a polycondensation. The mineral wool boards produced in this way can then be further processed, for example by applying further decorative layers or surfaces or by cutting the pressed boards to the desired size etc.

The application of ultrasonic to the binder is essential for the invention, as in this way a very good dispersion of the mineral fillers can be achieved and the agglomeration of particles can be effectively prevented. For this purpose, the ultrasonic input must be of sufficient intensity and duration. Exemplary values for the ultrasonic intensity are given in the examples described later in this document. Basically, the selection of the suitable ultrasonic intensity lies in the competence of the skilled person. It is essential that the intensity, based on the equipment used and the composition and quantity of the binder, is selected in such a way that the fillers are dispersed and preferably all larger agglomerations of particles are broken up by the ultrasonic effect.

The liquid resin preferably comprises phenolic resin or consists preferably of liquid phenolic resin. Phenolic resins are typically offered commercially in liquid form, whereby the liquid phenolic resin typically has a solid content of about 40 to 50% of resin. The remaining component is water, which usually evaporates during further processing of the phenolic resins and is therefore no longer present in the finished product. In connection with the present invention, different compositions are indicated by weight relative to the binder respectively the liquid resin. This always is based on the solids content of the liquid resin, since the water content can vary and, as mentioned, is not relevant for the finished product.

The mineral fillers preferably include kaolin, quartz flour, limestone, aluminium oxide and similar materials. Most preferred, the mineral fillers mainly consist of kaolin, quartz flour, limestone and/or aluminium oxide.

In principle, mineral fillers have a mean grain size $d_{50}$ from 10 nm to 150 μm, more preferably from 300 nm to 100 μm and most preferably from 500 to 900 nm. These grain sizes can be easily dispersed in the liquid resin and thus lead to a homogeneous, high-quality product.

Preferably the mineral fillers are added in an amount of 5 to 150 percent by weight based on the mass of the binder, based on the solids content of the binder, more preferably 10 to 100 percent by weight and most preferably 35 to 90 percent by weight. For example, an addition of 30 percent by weight of mineral fillers based on the mass of the binder means that 300 kg of mineral fillers are added for an amount of 1,000 kg of phenolic resin (based on the solids content, i.e. for a liquid phenolic resin without the water content). An addition of 120 percent by weight of mineral fillers means an addition of 1,200 kg of mineral fillers. The mineral filler is preferably added to the liquid resin before it is used to glue the mineral wool fibers. For a liquid phenolic resin with 40% solids content, the addition of mineral fillers in an amount of 80% by weight based on the mass of the binder means that 320 kg of filler is added to 1,000 kg of liquid phenolic resin. Because 1,000 kg of liquid phenolic resin with 40% solids content contains 400 kg of solid resin (80% of 400 kg is 320 kg). Since the mineral wool fibers are glued with the filler/resin mixture, the mineral fillers are distributed very well in the final board. This distribution is considerably improved by the inventive application of ultrasonic to the binder before the fibers are glued.

Preferably, the mineral wool fibers have a fiber length of 60 to 700 μm, even more preferably 80 to 600 μm and most preferably 100 to 500 μm. It has been shown that such fiber lengths are easy to process and can be used to produce stable and durable products.

Preferably, the glued fibers are pressed at temperatures between 130 and 180° C., more preferably 140 and 160° C. and also preferably at a specific pressing pressure of 15 to 35 bar. These temperature and pressure ranges lead to a good and complete curing of the resins provided, especially when phenolic resins are used. Phenolic resins condense under these pressures and temperatures, so that very stable and resistant mineral wool boards are produced, which can be worked on very well.

Preferably, the ratio of binder (based on the solids content of the resin in the binder) to mineral wool fibers is 10 to 30 percent by weight, more preferably 12 to 30 percent by weight and most preferably 14 to 25 percent by weight. The mass of mineral fillers is thus not taken into account. For example, a binder to mineral wool fibers ratio of 20 percent by weight means that 20 kg of binder is added to 100 kg of mineral wool fibers, based on the solids content of the resin in the binder. For example, when using a liquid phenolic resin with a solids content of 40%, this means that 50 kg of liquid phenolic resin (i.e. containing 20 kg of solid resin) is added per 100 kg of mineral wool fibers. These proportions have proven to be optimal in practice. They lead to very stable mineral wool boards that can be produced economically.

Preferably, the mineral wool fibers are glued with binder (i.e. the mixture of liquid resin and mineral fillers) in a blow line. The binder is injected directly into the fiber flow in the blow line. This process leads to a very homogeneous glue distribution and is very economical. In principle, the general expertise for the production of mineral wool boards can be used for the gluing of mineral wool fibers. Alternatively and also preferably, the mineral wool fibers can also be glued with binding agents using mechanical gluing. If larger quantities of filler are added to the binder, mechanical bonding of the fibers in known mixing devices can also be of advantage.

Preferably, the glued fibers are pressed using heat and pressure in a continuously operating double belt press. It is essential that the temperatures are sufficiently high to cure the resin during pressing. The temperatures required are generally known to the skilled person or are available from the suppliers or manufacturers of the liquid resins. The use of a continuous double belt press allows the continuous and thus economical production of large quantities of mineral wool boards. These exit the double belt press in the form of a long strand, which can then be cut to size.

Preferably, the mineral wool board obtained after pressing is further processed into a floor panel. For example and preferably, the surface of the mineral wool board is provided with a decorative surface, such as a decorative paper or similar. In addition, it is possible to provide the edges of the mineral wool board with coupling means, such as in particular tongue and groove elements, so that several mineral wool boards of the same type can be joined together to form a large-area covering.

Preferably, the glued fibers are pressed using heat and pressure in such a way that the resulting board has a density of more than 700 kg/m$^3$, preferably more than 900 kg/m$^3$ and most preferably more than 1,000 kg/m$^3$. Panels with such a density are highly compact, mechanically very robust and can be used in a variety of applications.

This invention also concerns a mineral wool board, which was preferably produced using one of the processes described above. The mineral wool board according to the invention therefore comprises mineral wool fibers with a fiber length of 50 to 800 μm, a binder in the form of a cured resin, in particular a cured phenolic resin and corresponding mineral fillers with preferably an average grain size $d_{50}$, of 10 nm to 150 μm, whereby the mineral wool board has a density of more than 500 kg/m$^3$.

The mineral fillers preferably include kaolin, quartz flour, limestone and/or aluminium oxide. Particularly preferred, the fillers mainly consist of these materials.

As described above in connection with the inventive process, the mineral fillers have preferably an average grain size from 10 nm to 50 μm, more preferably from 300 nm to 100 μm and most preferably from 500 to 900 nm. As described above in connection with the inventive method, the mineral wool fibers preferably have a fiber length of 60 to 700 μm, even more preferably 80 to 600 μm and most preferably 100 to 500 μm.

Preferably, the ratio of binder (based on the solid content of the resin in the binder) to mineral wool fibers is 10 to 30 percent by weight, more preferably 12 to 30 percent by weight and most preferably 14 to 24 percent by weight.

The mineral wool board preferably has a density of more than 700 kg/m³, preferably more than 900 kg/m³ and most preferably more than 1,000 kg/m³.

The mineral wool board according to the invention is preferably characterized by the following parameters or can be produced with these parameters if the method according to the invention is carried out:

Density according to DIN EN 323: 700 to 2,000 kg/m³, preferably 1,000 to 1,750 kg/m³ and most preferably 1,250 to 1,550 kg/m³;

Bending strength according to DIN EN 789 from 25 to 125 N/mm²;

Tensile strength according to DIN 52188 from 15 to 125 N/mm² and an elastic modulus (flexural) of 3,000 to 15,000 N/mm².

In the following, the method according to the invention is described in more detail using two examples. The examples are for illustration purposes only and should not be understood in a restrictive way.

EXAMPLE 1 (NOT IN ACCORDANCE WITH THE INVENTION)

In a first step, a liquid phenolic resin was produced in which one mol of phenol was mixed with 1.05 mol of formaldehyde and the pH was adjusted to approx. 8.3 to 8.9 using caustic soda. Condensation took place at 85° C. until the viscosity (measured at 20° C.) was approx. 65 mPas. It should be ensured that the water dilutability is 120 to 200% and the B time (at 150° C.) is 100 to 150 seconds. The solids content of the phenolic resin produced in this way according to DIN EN ISO 3251 was approx. 60%. In a further step, mineral wool fibers were prepared and provided. For this purpose, commercially available rock wool, which was obtained from the molten stone, was frayed to such an extent that no larger fiber agglomerates existed. This type of rock wool can be obtained commercially, for example, from manufacturers of such wool, such as Saint Gobain or Rockwool. Fiberization to a fiber length of approx. 150 to 800 μm allows uniform wetting of the fibers with the liquid binder. If the fiber length is too short, the glued fibers do not have the necessary structural strength. Too long a fiber length makes it difficult to evenly wet the fibers with the liquid binder. The mineral wool fibers provided in this way are then evenly glued with the liquid phenolic resin. The input quantity of phenolic resin was 12% by weight based on the solid resin. In the present example, 12 kg solid resin or 20 kg liquid phenolic resin (at a solids content of approx. 60%, 20 kg liquid phenolic resin contains approx. 12 kg solid resin and 8 kg water) were added per 100 kg of fibers. The sprayed fibers were then mixed in a mixer and the glued and mixed fibers were dried and then placed on a press plate, evenly distributed and pre-compressed under slight pressure. The application weight of the dry fiber cake was 96 kg/m² and the pressing took place at a temperature of 180° C. and 20 bar specific pressing pressure and a pressing time of 3 minutes. The boards produced in this way had a thickness of 7 mm and a density of 1,200 kg/m³ with the following mechanical properties: bending strength 38 N/mm²; elastic modulus (flexural) 5,600 N/mm², tensile strength 27 N/mm² and elastic modulus (tensile) of 5,500 N/mm².

EXAMPLE 2

The second example corresponds to the inventive method, in which mineral fillers were added to the liquid resin and the binder thus produced was subjected to ultrasonic application before it was applied to the fibers. The phenolic resin was initially produced as above. Then 650 g of the phenolic resin (with a solids content of 60% including 390 g of solid resin) were mixed with 350 g of kaolin, to produce 1,000 g of binder. This means that 350 g of kaolin was added to 390 g solid in the liquid resin, i.e. an amount of about 90% mineral filler based on the mass of the binder. The liquid mixture produced in this way was subjected to ultrasound with an output of 185 W and an area intensity of 120 W/cm² and an energy input of 14 kWh/t. The application of ultrasound causes an increase in temperature of the mixture. This should be limited to below 55° C. by appropriate cooling. With this type of energy input by ultrasound, microscopically no agglomerates of the mineral fillers in the binder are detectable. The ultrasonic application to the binder was carried out for approx. 5 minutes. The treated binder is provided for fiberboard production and has a viscosity at room temperature of 30 seconds, measured with DIN measuring cup/nozzle 8 mm.

In the mixer, 879 g mineral wool fibers were mixed with 321 g binder. The fibers should be mixed or glued immediately after ultrasonic application, as otherwise the well dispersed fillers could settle again. The solid resin content in this 321 g binder was thus about 125 g or about 40% (the 321 g binder consisted of about 112 g fillers and about 209 g liquid resin, which in turn had a solid content of 60%, i.e. 125 g solid resin and 84 g water). The fibers glued in this way were then dried so that the water was removed. The dried mixture of glued fibers was then placed on a press plate, evenly distributed and slightly pre-compacted. The final pressing took place at a temperature of 180° C., a specific pressing pressure of 20 bar and a pressing time of approx. 3 minutes.

The board had a thickness of 7 mm and a density of 1,284 kg/m³, a bending strength of 48 N/mm², an elastic modulus (flexural) of 9,500 N/mm², a tensile strength of 28 N/mm² and an elastic modulus (tensile) of 7,800 N/mm², which shows that the mechanical properties of the board are considerably improved compared to example 1. This is in particular true for bending strength, elastic modulus and tensile modulus.

DESCRIPTION OF PREFERRED EMBODIMENTS

In the following, the present invention is explained in more detail with reference to the attached figures, whereby:

FIG. 1 is a schematic block diagram of a sequence of an inventive process; and

Figure 2:
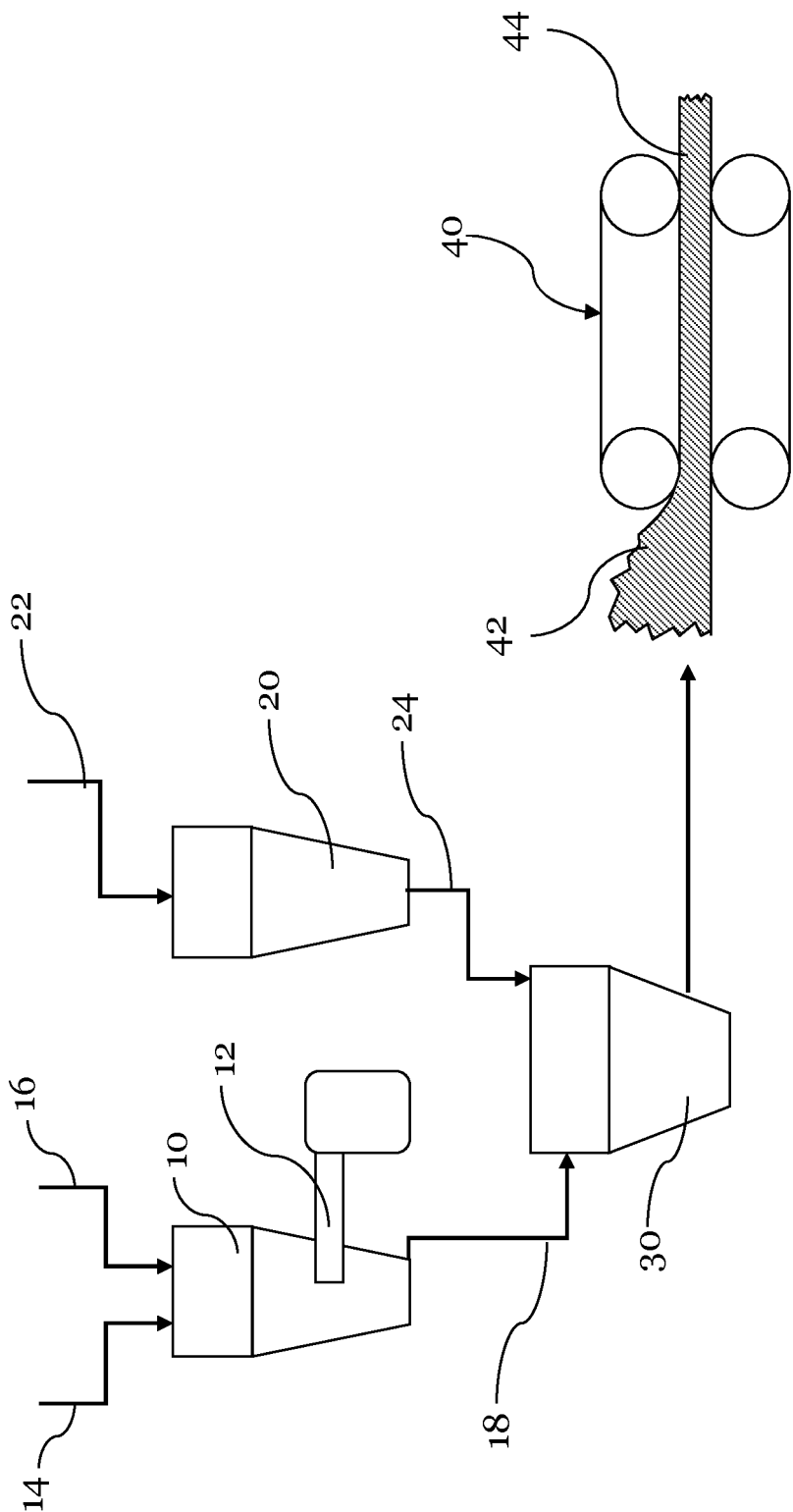

FIG. 2 schematically shows a plant for carrying out the process or for producing a mineral wool board.

FIG. 1 shows a schematic flow chart of an example of the inventive method for producing a mineral wool board. In step S1, mineral wool fibers with a fiber length of 50 to 800 μm are provided. This can be done, for example, by shredding commercially available rock wool to the desired fiber length. In step S2, a binder is provided which comprises a mixture of liquid resin and mineral fillers. The fillers should have an average grain size $d_{50}$ of 10 nm to 250 μm. Steps S1 and S2 do not necessarily have to be carried out in the specified sequence, but can also be carried out simultaneously or in a different sequence. In step S3, the binder, which essentially consists of the liquid resin and the mineral fillers, is subjected to an ultrasonic application, whereby the fillers are distributed in the liquid resin and preferably agglomerates of the fillers are destroyed or reduced in size. In step S4, the mineral wool fibers provided are glued with the binder. The fibers must necessarily be glued after steps S1, S2 and S3, as ultrasonic application only makes sense as long as the mineral wool fibers have not been added to the binder. In addition, step S4 should take place immediately after step S3, as the fillers dispersed by the ultrasonic application can otherwise settle again in the liquid resin. As the last of the steps in step S5, the glued fibers are pressed using heat and pressure to form a mineral wool board.

FIG. 2 shows schematically a plant for the production of an inventive mineral wool board or for the execution of the inventive method. Reference number 10 refers to a mixer in which liquid resin and fillers are introduced and mixed via a supply 14 for liquid resin and a supply 16 for mineral fillers. Processing takes place in batches. After feeding and mixing the desired quantities of resin and fillers, ultrasound is applied to the binder by means of an ultrasound probe 12. This results in a good distribution or dispersion of the fillers in the liquid resin and a reduction or destruction of agglomerates of fillers. Ultrasound can be applied for a few minutes, such as 5 to 15 minutes. The intensity or strength of the ultrasonic application depends on the materials used, such as the viscosity of the liquid resin and the size and consistency of the mineral fillers. The intensity of ultrasonic application should be selected so that the fillers are well distributed in the liquid resin and larger agglomerates of fillers are effectively crushed or destroyed.

Reference number 20 refers to a shredder which can be fed with mineral wool or mineral wool fibers via a supply 22. In the shredder 20 the mineral wool fibers are shredded to a fiber length of 50 to 800 μm. The correspondingly shortened fibers are fed via a feed 24 to a gluing device 30. The binder, consisting of the liquid resin and the mineral fillers, is fed from mixer 10 to gluing unit 30 via a supply 18. The fibers should be glued immediately after application of the ultrasound. In gluing unit 30 the fibers are glued with the binder. The fibers glued in this way are dried, if necessary, after the gluing device 30 and then fed to a double belt press 40. The dried and glued mineral wool fibers are spread onto a conveyor belt and form a glued fiber mat 42. the fiber mat 42 is fed through the double belt press 40 and pressed into a mineral wool board 44 under the effect of heat and pressure. In this case, the mineral wool board 44 is available as a long strand, which can then be cut to size and further processed if desired.

REFERENCE CHARACTER LIST

10 Mixer
12 Ultrasonic probe
14 Supply of liquid resin
16 Feed for fillers
18 Binder feed
20 Shredder
22 Mineral wool supply
24 Supply of fibers
30 Glue application device
40 Double belt press
42 Glued fiber mat
44 Mineral wool board

The invention claimed is:

1. A method for manufacturing a mineral wool board comprising the following steps:
providing mineral wool fibers with a fiber length of 50 to 800 μm;
providing a binder comprising a mixture of liquid resin and mineral fillers having an average grain size $d_{50}$ of 10 nm to 250 μm; and thereafter in the order indicated:
applying ultrasound to the binder to distribute the fillers in the liquid resin;
gluing the fibers with the binder, and
pressing the glued fibers using heat and pressure to a density of more than 500 kg/m$^3$.

2. The method according to claim 1, wherein the liquid resin comprises phenolic resin.

3. The process according to claim 1, wherein the mineral fillers comprise kaolin, quartz flour, limestone, and alumina.

4. The method according to claim 1, wherein the mineral fillers have an average grain size $d_{50}$ from 300 nm to 100 μm.

5. The method according to claim 1, wherein the mineral fillers are added in an amount of 5 to 150% by weight based on the mass of the solids content of the resin of the binder.

6. The method according to claim 1, wherein the mineral wool fibers have a fiber length of 60 to 700 μm.

7. The method according to claim 1, wherein the step of pressing the glued fibers takes place at temperatures between 130-180° C.

8. The method according to claim 1, wherein the ratio of binder, based on the solids content of the resin of the binder, to mineral wool fibers is 10 to 30% by weight.

9. The method according to claim 1, wherein the gluing of the mineral wool fibers with the binder is carried out in a blow line.

10. The method according to claim 1, wherein the mineral wool fibers are glued with the binder by means of mechanical gluing.

11. The method according to claim 1, wherein the pressing is carried out in a continuous double-belt press.

12. The method according to claim 1, wherein after pressing, the mineral wool board thus obtained is further processed into a floor panel.

13. The method according to claim 1, wherein the glued fibers are pressed using heat and pressure in such a way that the resulting board has a density of more than 700 kg/m$^3$.

14. A mineral wool board comprising:
mineral wool fibers with a fiber length of 50 to 800 μm;
binder in the form of cured resin;
mineral fillers comprising caoline, quartz flour, limestone and/or aluminium oxide with an average grain size $d_{50}$ of 300 nm to 100 μm,
wherein the mineral wool board has a density of more than 500 kg/m$^3$.

15. The mineral wool board according to claim 14, wherein the mineral fillers have an average grain size $d_{50}$ of 500 to 900 nm.

16. The mineral wool board according to claim 14, wherein the mineral wool fibers have a fiber length of 60 to 700 μm.

17. The mineral wool board according to claim 14, wherein the ratio of binder, based on the solids content of the resin of the binder, to mineral wool fibers is 10 to 30% by weight.

18. The mineral wool board according to claim 14, wherein the mineral wool board has a density of more than 700 kg/m$^3$.

19. The mineral wool board according to claim 14, wherein the binder is in the form of cured phenolic resin.

* * * * *